Nov. 9, 1954  J. H. SHUHART  2,694,101
VIBRATION DAMPER FOR TRANSMISSION LINES
Filed Sept. 29, 1950
FIG. 1
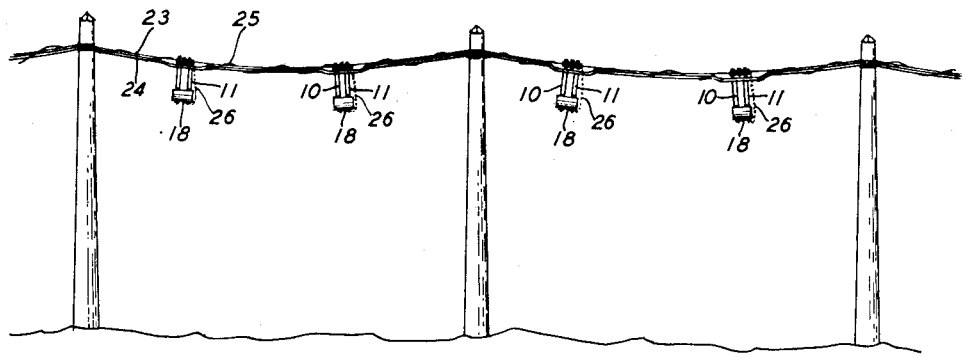
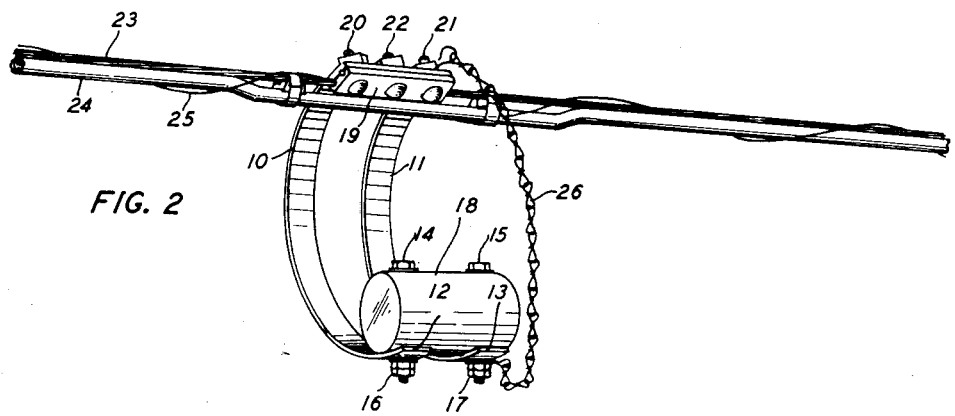
FIG. 2
FIG. 3
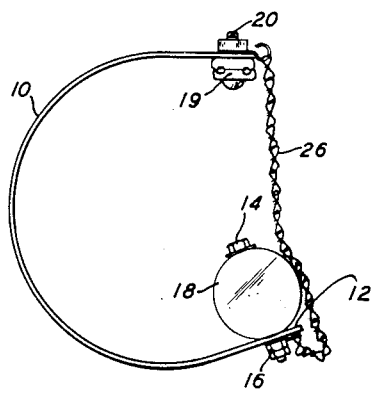
FIG. 4
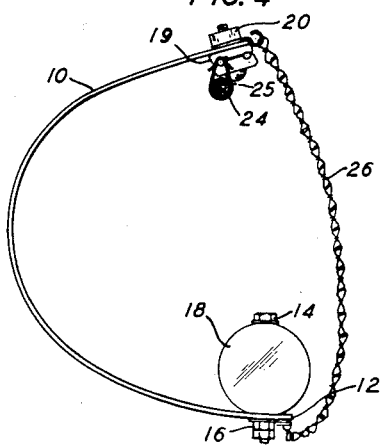
INVENTOR
J. H. SHUHART
BY
ATTORNEY

United States Patent Office 2,694,101
Patented Nov. 9, 1954

2,694,101

VIBRATION DAMPER FOR TRANSMISSION LINES

John H. Shuhart, Morris Plains, N. J., assignor to Bell Telephone Laboratories, Incorporated, New York, N. Y., a corporation of New York Application September 29, 1950, Serial No. 187,477

3 Claims. (Cl. 174—42)

This invention relates to vibration dampers and more particularly to vibration dampers for preventing objectionable vibrations or dancing in suspended cables, for example electrical transmission lines for the transmission of intelligence or power.

One object of the present invention is to provide a simple and effective device to prevent objectionable movements of a suspended cable or electrical conductor.

The vibration with which this invention is primarily concerned is to be distinguished from the lateral swinging of the cable. The objectionable vibrations which the herein disclosed invention is intended to prevent or limit to such an extent that they are no longer objectionable, take place in a substantially vertical plane and produce standing waves in the suspended cable and having substantial amplitudes. It has been determined that the vibrations in the span of suspended cable are caused by transverse air currents and breezes of low velocity which build up waves. As the velocity of the air currents increases the amplitude of the vibrations increases and the distances between the nodes increase.

It has been found in the case of suspended electrical transmission lines, particularly in the telephone plant, that with an increase in the length of the span and an increase in the tension of the cables, the dancing or vibration is more severe and gradually causes the crystallization of the metal in the cable, at the point of support, with the consequent failure of the cable.

Numerous devices have been tried to prevent objectionable vibration or dancing of suspended electrical transmission cables but the results thus far have been unsatisfactory. I have discovered that when a properly placed inertia member is suspended from an arcuate shaped spring member, which in turn is secured to the conductor, and that when the weight of the inertia member has a direct relation with respect to the stiffness of the arcuate member, that an effective damping of objectionable vibrations in the cable is obtained and the vibrations are so reduced or eliminated that no damage is done to the cable.

Particularly advantageously, the device of this invention is designed to have a fundamental frequency which approximates a low harmonic of the suspended conductor in the span to which it is applied, for example the second harmonic.

My invention will be more clearly understood from the following detailed description when read in connection with the following drawings:

Fig. 1 is a view of an electrical transmission line with the vibrating dampers of my invention installed thereon;

Fig. 2 is a fragmentary perspective view of a transmission line with the vibration damper of my invention secured thereto;

Fig. 3 is a side elevational view of the damper of this invention before it is positioned on the supporting strand; and Fig. 4 is a side elevational view, similar to Fig. 3 but with the device secured to the suspension strand and the arcuate members extended due to the weight of the inertia mass.

The vibration damper of my invention, as shown in the various figures of the drawings, comprises a pair of arcuate spring members 10 and 11 having secured at their free ends 12 and 13, by means of the bolts 14 and 15 and nuts 16 and 17, an inertia mass 18 which may be constructed of any suitable material. The opposite ends of the members 10 and 11 are secured to a clamping device 19, by means of the bolts 20 and 21 which, with the cooperation of the bolt 22, secures the damper to the strand 23 which supports the cable 24 by means of the lashing wire 25.

Secured to the bolt 21 in the clamp 19 is one end of a chain 26, the other end of which is secured under the nut 17 of the bolt 15 on the end 13 of the spring member 11. The chain 26 serves as a safety device to prevent the damper from being displaced from the strand in the event that the spring members 10 and 11 should fail.

In practice it has been found desirable as shown in Fig. 1 to place the vibration damper of this invention at predetermined positions in the span, for example, at the one-quarter and two-thirds points. With this placement the vertical vibrations of the cable are eliminated or reduced to such an extent that they are not objectionable.

While I have shown and described the preferred embodiment of my invention it is to be understod that various changes and modifications may be made therein without departing from the spirit of the invention.

What is claimed is:

1. In combination with an electrical conductor in a span, a vibration damper comprising a pair of substantially U-shaped spring members downwardly depending from said conductor, extending transverse thereto and having their upper ends secured to said conductor, and an inertia member affixed to the free ends of said U-shaped members below and in substantial vertical alignment with said conductor.

2. In combination with an electrical conductor in a span, a vibration damper comprising a pair of substantially U-shaped spring members downwardly depending from said conductor, extending transverse thereto and having their upper ends secured to said conductor, an inertia member affixed to the free ends of said U-shaped members below and in substantial vertical alignment with sad conductor, and means secured to the ends of one of said U-shaped members for closing the gap therebetween to prevent the displacement of said damper.

3. In combination with a suspension strand in a span, a vibration damper comprising a pair of substantially U-shaped spring members downwardly depending from said strand, extending transverse thereto and having their upper ends secured to said strand, and an inertia member affixed to the free ends of said U-shaped members below and in substantial vertical alignment with said strand, said damper having a natural frequency substantially the same as that of a low harmonic of the strand.

References Cited in the file of this patent

UNITED STATES PATENTS

| Number | Name | Date |
|---|---|---|
| 2,215,541 | Buchanan et al. | Sept. 24, 1940 |
| 2,281,366 | Metcalf | Apr. 28, 1942 |

FOREIGN PATENTS

| Number | Country | Date |
|---|---|---|
| 697,608 | France | Nov. 4, 1930 |
| 362,932 | Great Britain | Dec. 7, 1931 |
| 367,767 | Great Britain | Feb. 19, 1932 |
| 791,820 | France | Oct. 7, 1935 |